(12) United States Patent
Parker et al.

(10) Patent No.: US 10,173,191 B2
(45) Date of Patent: Jan. 8, 2019

(54) ABRASION RESISTANT CONTROLLED CAVITATION REACTOR

(71) Applicant: Hydro Dynamics, Inc., Rome, GA (US)

(72) Inventors: Derek E. Parker, Lyerly, GA (US); C. Glenn Bonds, Lindale, GA (US); Douglas G. Mancosky, White, GA (US); Daniel A. Armstead, White, GA (US); Kelly Hudson, Rome, GA (US)

(73) Assignee: Hydro Dynamics, Inc., Rome, GA (US)

( * ) Notice: Subject to any disclaimer, the term of this patent is extended or adjusted under 35 U.S.C. 154(b) by 218 days.

(21) Appl. No.: 15/148,410

(22) Filed: May 6, 2016

(65) Prior Publication Data

US 2016/0325255 A1 Nov. 10, 2016

Related U.S. Application Data

(60) Provisional application No. 62/158,766, filed on May 8, 2015.

(51) Int. Cl.

| | |
|---|---|
| *B01J 8/16* | (2006.01) |
| *B01J 19/00* | (2006.01) |
| *B01F 7/00* | (2006.01) |
| *B01F 13/10* | (2006.01) |
| *B01F 3/12* | (2006.01) |
| *B01J 8/22* | (2006.01) |

(52) U.S. Cl.
CPC .............. *B01J 8/16* (2013.01); *B01F 3/1221* (2013.01); *B01F 7/00816* (2013.01); *B01F 13/1016* (2013.01); *B01F 13/1022* (2013.01); *B01J 8/222* (2013.01); *B01J 19/008* (2013.01); *B01J 2208/00867* (2013.01); *B01J 2208/00893* (2013.01)

(58) Field of Classification Search
USPC ...................................... 366/176.1
See application file for complete search history.

(56) References Cited

U.S. PATENT DOCUMENTS

| 2010/0140107 A1 | 6/2010 | Sloan |
| 2013/0266703 A1 | 10/2013 | Hassan et al. |

FOREIGN PATENT DOCUMENTS

| WO | WO 2009/062654 | 5/2009 |

OTHER PUBLICATIONS

WO 2009/062654, Knauer, May 2009, machine translation.*
Written Opinion and Search Report for International Application No. PCT/US2016/031185 dated Jul. 21, 2016.

* cited by examiner

*Primary Examiner* — Mark Halpern
(74) *Attorney, Agent, or Firm* — Womble Bond Dickinson (US) LLP

(57) ABSTRACT

A controlled cavitation reactor is disclosed that is particularly suited to the treatment of abrasive fluids and slurries with a minimum of erosion and mechanical failure caused by abrasion. The reactor includes a generally cylindrical housing having a peripheral wall that extends between end plates. A rotor is rotatably disposed in the housing and has at least one outer peripheral surface spaced from the peripheral wall to define a cavitation zone therebetween. A plurality of bores extends through the peripheral surface of the rotor. The rotor may be formed with a central void zone between two lobes of the rotor with each lobe defining a separate cavitation zone with the peripheral wall of the housing. One or more inlet ports is arranged to introduce fluid to the housing tangentially and within one or more void zones. One or more exit ports is arranged to receive fluid from the housing tangentially within another void zone. As a result, fluid takes a spiral path into the housing, across the cavitation zone, and out of the housing. This greatly reduces sharp changes in direction and accordingly reduces abrasion and consequent damage.

7 Claims, 11 Drawing Sheets

ABRASION RESISTANT CONTROLLED CAVITATION REACTOR

REFERENCE TO RELATED APPLICATION

Priority is hereby claimed to the filing date of U.S. provisional patent application 62/158,766 titled Abrasion Resistant Controlled Cavitation Reactor filed in the USPTO on May 8, 2015.

TECHNICAL FIELD

This invention relates generally to exposing commercial fluid flows to controlled mechanically induced cavitation in a cavitation reactor to obtain mixing, reaction, extraction, and other desired results, and more specifically to controlled cavitation reactor designs for treating abrasive fluids with minimum internal abrasion damage to the reactor.

BACKGROUND

Controlled cavitation reactors for treating commercial fluid flows are known. U.S. Pat. Nos. 8,465,642; 8,430,968; 7,507,014; 7,360,755; and 6,627,784, all owned by the assignee of the present patent application, disclose variations of controlled cavitation reactors. These patents are hereby incorporated by reference. Controlled cavitation reactors such as those disclosed in the incorporated references have proven highly effective and efficient for a variety purposes including, for instance, liquid-gas mixing, extraction of sugars and starches from biomaterial, promoting electrochemical reactions, emulsification, oxidation, hydrogenation, hydration, and a variety of other industrial applications. Problems have persisted, however, when those controlled cavitation reactors have been used to treat fluid flows that are inherently abrasive in nature. More specifically, fluids containing abrasive compounds such as small pieces of sand, rock, glass, shells, and fibrous cellulose flowing through controlled cavitation reactors have tended to abrade and erode internal components of controlled cavitation reactors. Oil field drilling mud is an example of an abrasive fluid. The internal abrasion can lead to degraded performance and eventually to mechanical failure. As a result, controlled cavitation reactors in the past have not been particularly suited for treating flows of abrasive fluids.

A need exists for a controlled cavitation reactor capable of treating flows of abrasive fluids with a minimum of abrasive damage to internal surfaces and components of the reactor. It is to the provision of such a controlled cavitation reactor that the present invention is primarily directed.

SUMMARY

Briefly described, a controlled cavitation reactor is configured to minimize abrasion and erosion when industrial flows of abrasive fluids and slurries are moving through the reactor for treatment. The reactor includes a rotor mounted for rotation within a cylindrical housing. The rotor has at least one cylindrical peripheral surface with a plurality of bores arranged therethrough. The peripheral surface of the rotor is spaced from an internal cylindrical wall of the housing so that a cavitation zone is defined between the peripheral surface of the rotor and the inner wall of the housing. As a fluid to be treated is pumped into the reactor moves through the cavitation zone with the rotor rotating at a high rotation rate. As a result, highly energetic cavitation bubbles are continuously created in the fluid and collapse within the bores of the rotor. This, in turn, causes high energy shock waves to propagate through the fluid in the cavitation zone, thus achieving the desired mixing or reaction or other treatment of the fluid.

According to the present invention, inlet ports and outlet ports for the fluid are arranged through the outer cylindrical wall of the reactor housing. These ports are configured to introduce fluid into and extract fluid from the housing in directions that are substantially tangential to the inner wall of the housing. In one embodiment, for example, two spaced apart rotors or rotor lobes are disposed in the housing. Void zones are defined on either side of the rotor(s) and a void zone is defined between the rotors or rotor lobes. Two inlet ports extend through the cylindrical wall of the housing and communicate with the void zones on either side of the rotor or rotor lobes. An exit port also extends through the cylindrical wall of the housing and communicates with the void zone between the two rotors or rotor lobes. The ports are located to introduce fluid to and extract fluid from the reactor in the direction of rotation of the rotor. This allows fluid to take a smooth spiral path through the reactor without having to make sharp turns as can be the case with prior art reactors. It has been found that such a configuration minimizes the directional changes that a fluid must make and this, in turn, mitigates abrasion and erosion damage significantly compared to prior art controlled cavitation reactor designs. Thus, a controlled cavitation reactor is provided that addresses the problems and shortcomings of prior art reactors for treating abrasive fluids.

These and other features, aspects, and advantages of the invention will be better appreciated upon review of the detailed description set forth below when taken in conjunction with the accompanying drawing figures, which are briefly described as follows.

DETAILED DESCRIPTION OF THE EXAMPLE EMBODIMENTS

Figure 1:
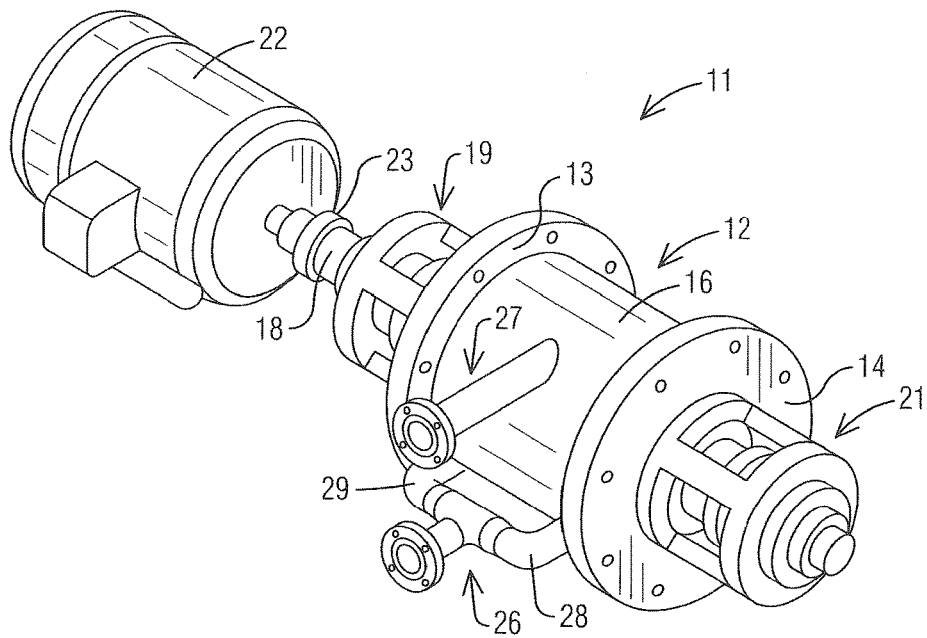
FIG. 1 is a perspective view of a controlled cavitation reactor that exemplifies principles of the present invention in one preferred embodiment.

Disclosed is a controlled cavitation reactor configured to mitigate abrasion and erosion damage when acting on or treating or reacting abrasive fluids. Abrasion can be greatest where an abrasive fluid (or any fluid for that matter) changes direction. Examples include at a 90 degree elbow in a pipe or at the surface of an obstruction in the flow. Prior art controlled cavitation reactors require a fluid flowing therethrough to make several sharp changes in direction. These may include, for instance, where the inlet port enters the housing perpendicular to the side of the rotor and where the fluid changes direction to traverse the cavitation zone between the peripheral surface of the rotor and the inner wall of the housing. These are examples of locations particularly prone to erosion and mechanical failure when abrasive fluids are pumped through a prior art controlled cavitation reactor.

The controlled cavitation reactor disclosed herein addresses the problem of erosion by changing dramatically the inlets and outlets of the reactor to eliminate sharp changes in direction. Fluid to be treated in the reactor enters through an inlet port in the peripheral wall of the housing in a direction that is tangential to the inner surface of the peripheral wall. Preferably, the fluid enters in the direction of rotation of the rotor in a circumferential gap or void zone formed on one or both sides of the rotor. The fluid thus moves in a circulating spiral path in the void zones. It then spirals into and through the cavitation zone or zones between the peripheral surface of the rotor or rotors and the inner cylindrical wall of the housing. While spiraling through the cavitation zone, the fluid is exposed to cavitation induced shock waves to obtain a desired change in or effect upon the fluid.

Once the fluid has moved through the cavitation zone in this manner, it moves, again in a spiraling pattern, out of the cavitation zone or zones and enters a void zone on the other side of the rotor or between two rotors or rotor lobes. The treated fluid then exits the reactor through an outlet port that also is oriented tangential to the peripheral wall of the housing. The outlet port receives the spiraling treated fluid without imposing a drastic change in direction. This motion of the fluid dramatically reduces directional changes encountered by the fluid as it moves through the reactor. It has been found that erosion and malfunction due to abrasion within the reactor is drastically reduced. A balanced flow design with two inlets aligned with voids on opposite sides of the rotor and a single outlet in a void zone two rotors or two lobes of a single rotor can be further effective in reducing abrasion and erosion.

The controlled cavitation reactor of the present invention can be made from materials of high hardness and abrasion resistance for longest life since abrasion is most often mitigated and minimized rather than being eliminated altogether. It is also possible to place removable and replaceable armor inserts for the fluid contacting surfaces of the unit. The attached drawing figures illustrate examples of controlled cavitation reactors that embody principles of the present invention is preferred forms. These drawing figures will now be discussed with emphasis on the differences from the prior art embodied therein. Detailed descriptions of controlled cavitation reactors in general can be found in the incorporated references.

Figure 2:
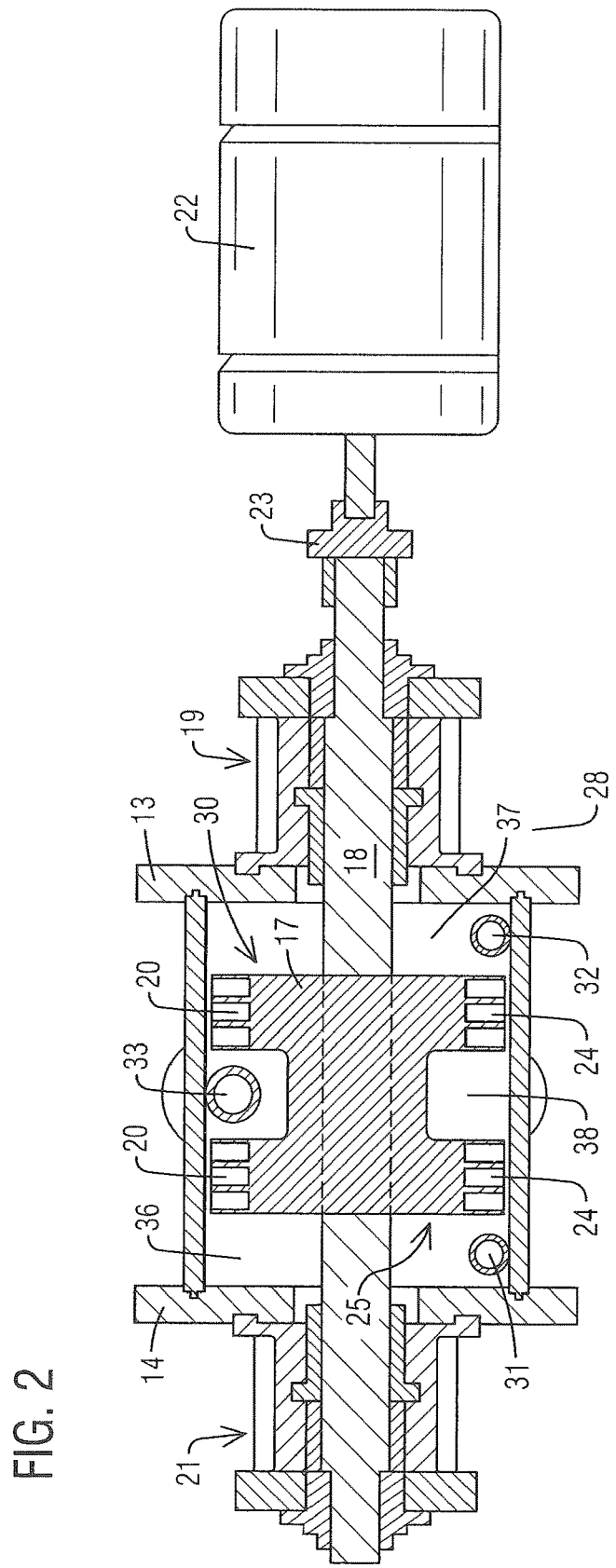
FIG. 2 is a rear cross sectional view of the controlled cavitation reactor illustrated in FIG. 1

FIG. 1 illustrates a controlled cavitation reactor 11 that includes a generally cylindrical housing 12 having a proximal endplate 13 and a distal endplate 14. A cylindrical outer wall 16 extends between the proximal and distal endplates. The outer wall 16 and the proximal and distal endplates 13 and 14 together define a cylindrical interior cavity within the housing as best shown in FIG. 2. A rotor 17 (FIG. 2) is disposed within the housing and is mounted on a shaft 18 that is rotatably journaled in bearing assemblies 19 and 21. Rotation of the shaft 18 causes corresponding rotation of the rotor within the housing. A motor 22 is coupled through coupling 23 to the shaft 18 for selective rotation of the shaft 18 and thus rotation of the rotor 17. In the illustrated embodiments, the rotor is a single component formed with two lobes separated by a void zone 38. It will be understood, however, that this single piece rotor may be replaced by two spaced apart rotors with comparable results.

Referring again to FIG. 1, a fluid inlet 26 communicates through the peripheral wall 16 of the housing and has a first branch 28 near one end of the housing and a second branch 29 near the other end of the housing. The branches of the fluid inlet 26 communicate with the interior of the housing through inlet ports 31 and 32 (FIG. 2). The inlet ports 31 and 32 are arranged to direct fluid into the housing in a direction substantially tangential to the inner surface of the peripheral wall 16 of the housing. A fluid outlet 27 communicates through an outlet port 33 (FIG. 2) in the peripheral wall 16 of the housing, and is located substantially diametrically opposite the fluid inlet ports 31 and 32. The outlet port 33 is arranged to receive fluid from the housing from a direction substantially tangential to the inner surface of the peripheral wall 16. The motor is configured to rotate the rotor within the housing in a counter-clockwise direction as viewed from the distal endplate 14, as perhaps best illustrated in FIG. 6.

As illustrated in FIG. 2, the rotor 17 of this embodiment is formed with a cylindrical distal lobe 25 and a cylindrical proximal lobe 30. The lobes are separated by a void zone 38 formed between the lobes. The peripheral surfaces of the distal and proximal lobes are provided with cavitation bores 20 extending radially into their peripheral surfaces. A relatively narrow space 24, defines a cavitation zone between the peripheral surface of each lobe and the inner surface of the peripheral wall 16 of the housing. A void zone 36 is defined between the rotor 17 and the distal endplate 14 and another void zone 37 is defined between the rotor 17 and the proximal endplate 13 of the housing. Central void zone 38 resides between the first and second lobes 25 and 30 of the rotor 17. Inlet ports 31 and 32 communicate with the housing 12 within void zones 36 and 37 respectively. Similarly, outlet port 33 communicates with the housing 12 within the central void zone 38. Thus, fluid enters the housing tangentially into the void zones 36 and 37 on either side of the rotor and exits tangentially from the central void zone 38.

Figure 3:
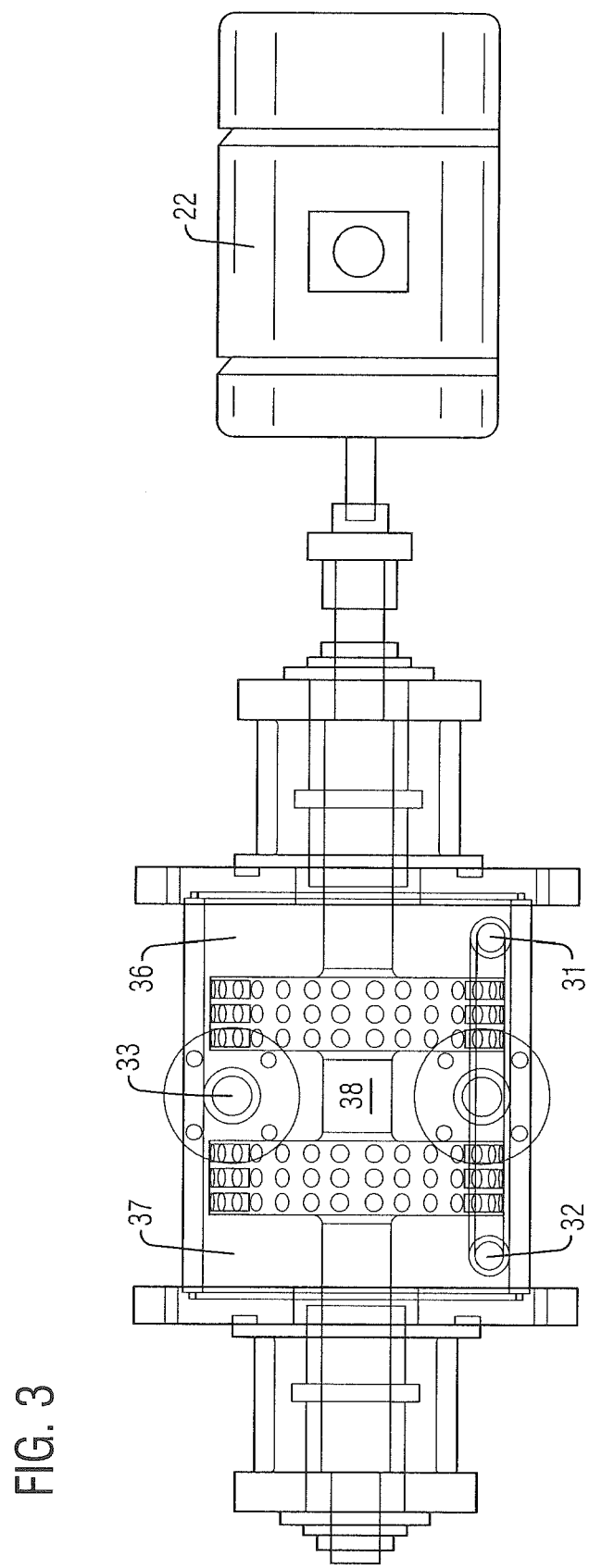
FIG. 3 is a front cross sectional view of the controlled cavitation reactor illustrated in FIG. 1
Figure 4:
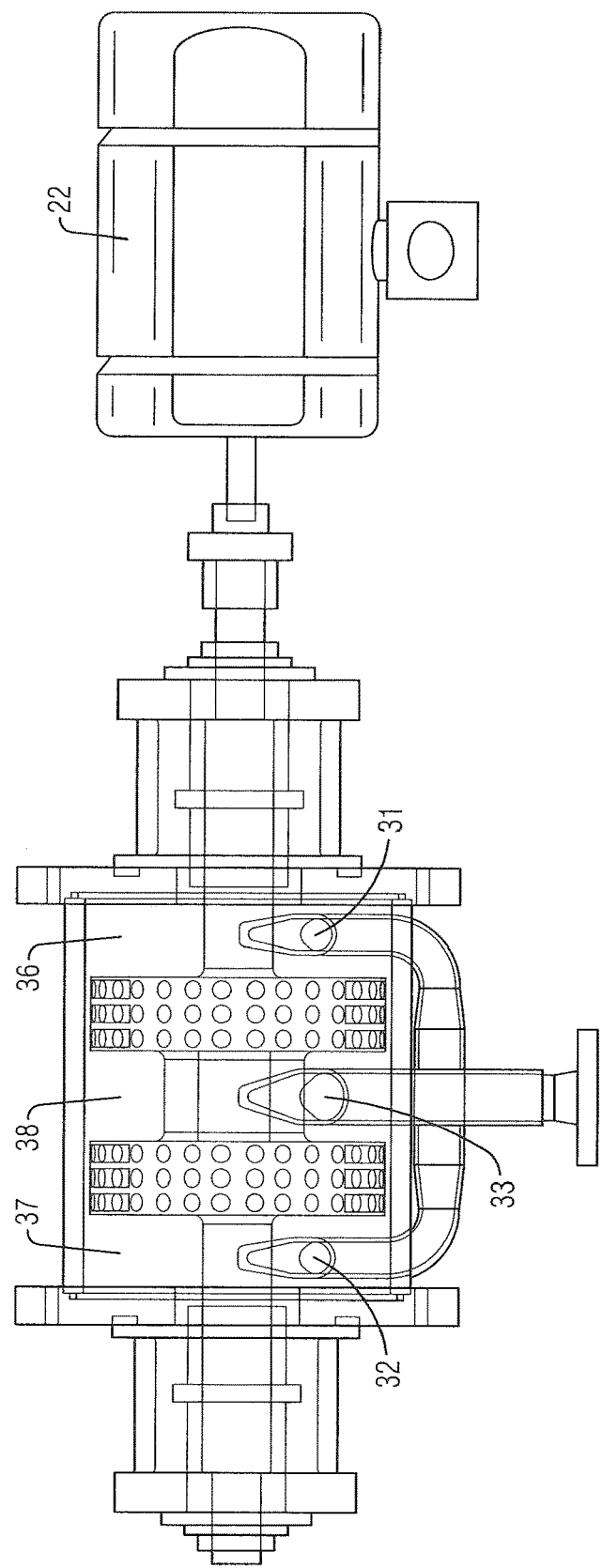
FIG. 4 is a top cross sectional view of the controlled cavitation reactor illustrated in FIG. 1
Figure 5:
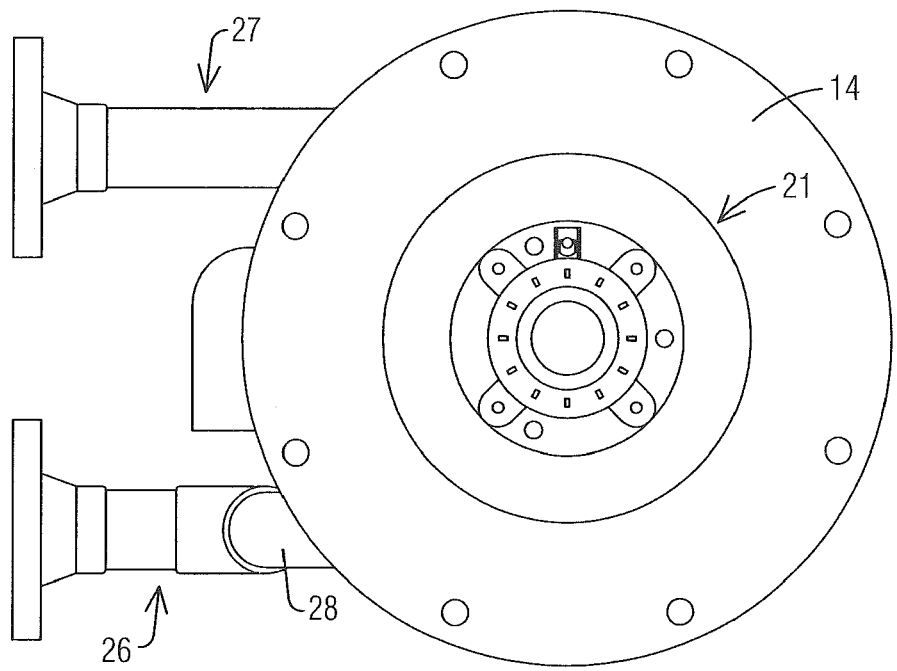
FIG. 5 is a right end view of the controlled cavitation reactor illustrated in FIG. 1

FIG. 3 simply shows the reactor 11 in transparency from the opposite side relative to FIG. 2. The void zones 36 and 37 and the central void zone 38 are visible as are the inlet ports 31 and 32 and the outlet port 33. FIG. 4 shows the reactor 11 in transparency from the top relative to FIGS. 2 and 3. The void zones and the inlet and outlet ports are visible. FIG. 4 illustrates better the configuration of the inlet and outlet ports through the peripheral wall of the housing to receive and expel fluid from the reactor in directions tangential to the inner surface of the peripheral wall. FIGS. 5 through 8 are various lateral cross sections of the housing and rotor. FIG. 5 shows the reactor from the distal endplate 14 and illustrates the distal bearing assembly 21, the inlet 26 and one of its branches 28, and the outlet 27.

Figure 6:
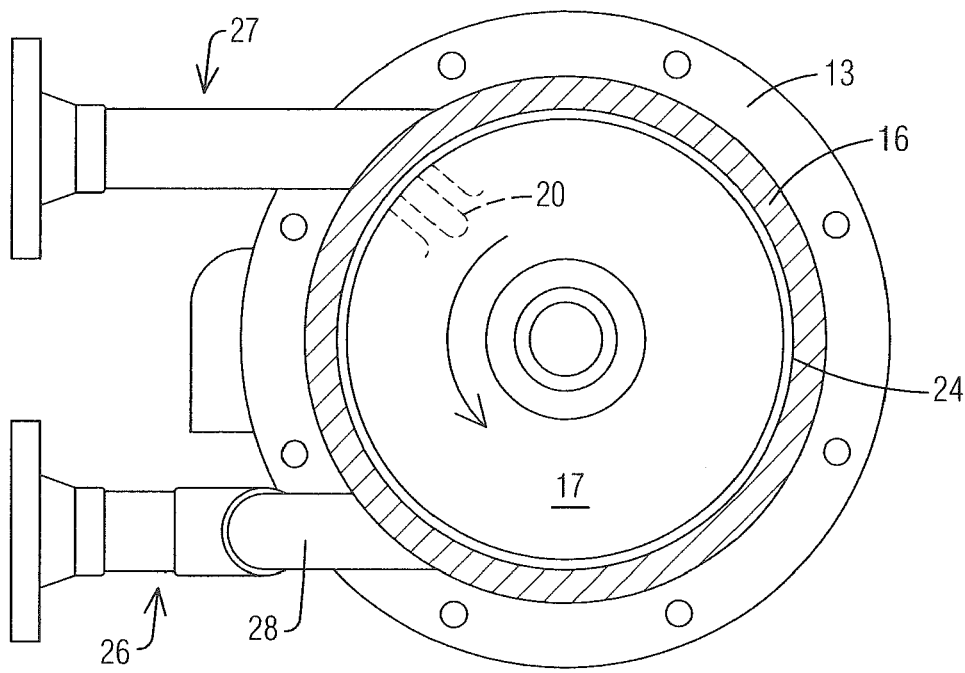
FIG. 6 is a radial cross sectional view of the controlled cavitation reactor shown in FIG. 1 taken along line 6-6 thereof.

FIG. 6 is a cross section taken from just inside the distal endplate 14 of FIG. 5. The side of one lobe of the rotor 17 is visible in the housing as is the cavitation zone 24 defined between the peripheral surface of the rotor and the peripheral wall 16 of the housing. One of the cavitation bores 20 is illustrated in phantom line and it will be understood that these cavitation bores are formed all around the peripheral surface of the rotor's two lobes as mentioned above. From the perspective of FIG. 6, the rotor is rotated in a counter-clockwise direction during operation as indicated by the arrow. It will be appreciated that with such rotation, the rotor is moving through the bottom of its cycle in the same direction that fluid is entering the reactor tangentially through the inlet branches 28. Further, the rotor moves through the top portion of its cycle in the same direction as fluid that is exiting the reactor through the outlet 27.

Figure 7:
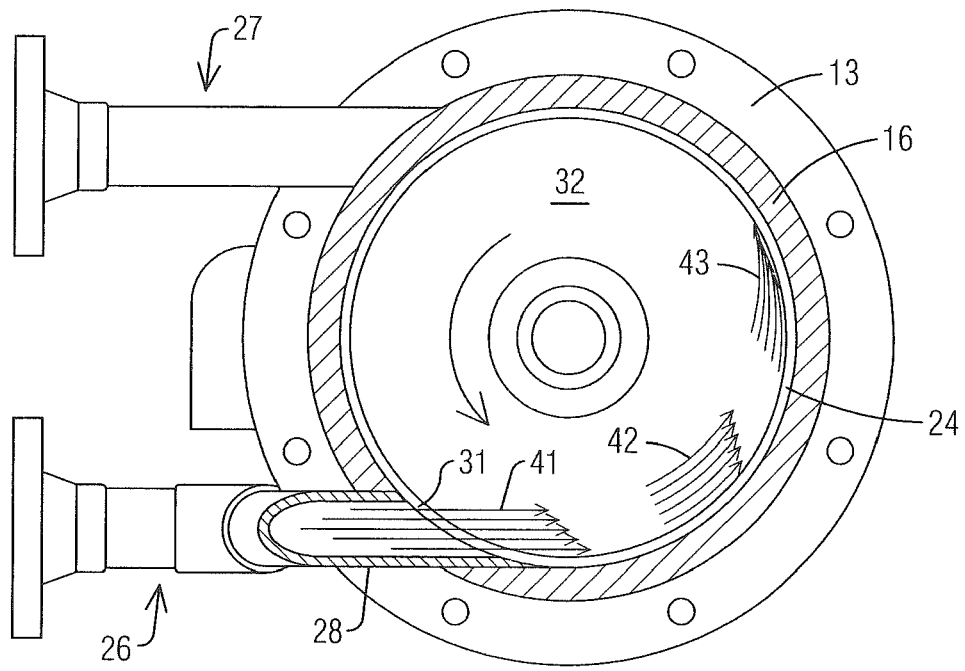
FIG. 7 is a radial cross sectional view of the controlled cavitation reactor shown in FIG. 1 taken along line 7-7 thereof.

FIG. 7 is a cross section through branch 28 of the inlet 26 and illustrates motion of a fluid 41 as it enters the reactor through inlet port 31. More specifically, as the fluid 41 enters the reactor in a direction tangential to the inner surface of the peripheral wall of the housing and into the void zone 36 (FIG. 2), the peripheral wall of the housing begins to direct the flow into a curve as illustrated at 42. The fluid may be thought of as being directed into a circular or spiral path within the void zone 36. The speed of the fluid flow may be adjusted to be approximately the same as the surface speed of the rotor 17; or, it may be adjusted to be some desired fraction or multiple of the surface speed of the rotor. In any case, as the fluid circulates around the void zone 36 it eventually spirals into the cavitation zone 24 as indicated at 43. As the fluid moves through the cavitation zone 24, it is subjected to high energy shock waves created by cavitation events within the bores of the rotor. It will thus be appreciated by the skilled artisan that the fluid enters the housing and moves into the cavitation zone without making any drastic changes in direction. This, in turn, greatly reduces abrasion and related deterioration of components within the reactor, especially when treating abrasive fluids within the reactor. Of course, fluid simultaneously enters the void zone 37 (FIG. 2) on the opposite side of the rotor and moves in the same way through the cavitation zone between the other lobe of the rotor and the inner wall of the housing.

Figure 8:
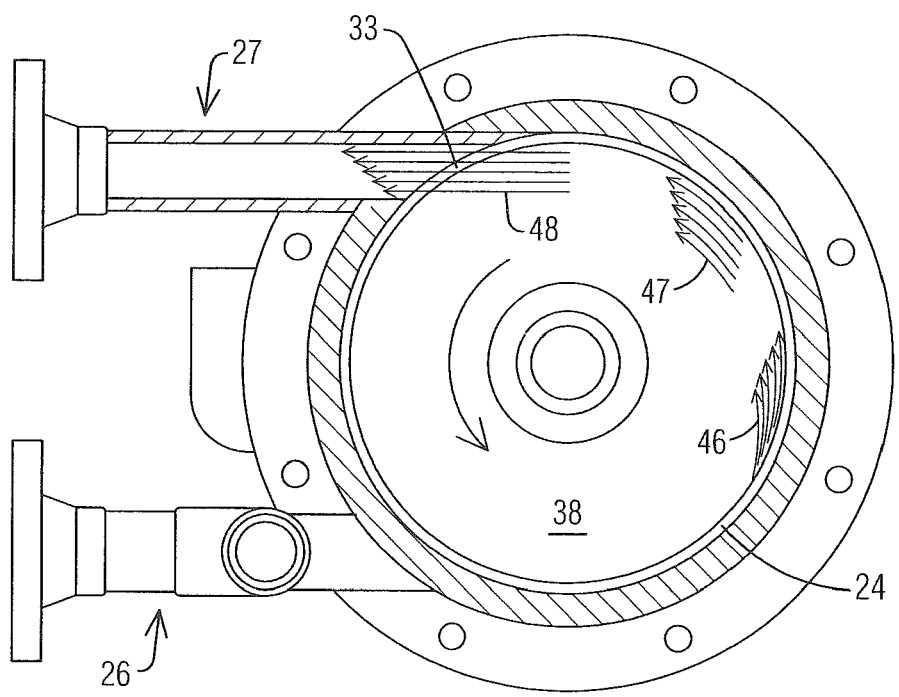
FIG. 8 is a radial cross sectional view of the controlled cavitation reactor shown in FIG. 1 taken along line 8-8 thereof.
Figure 9:
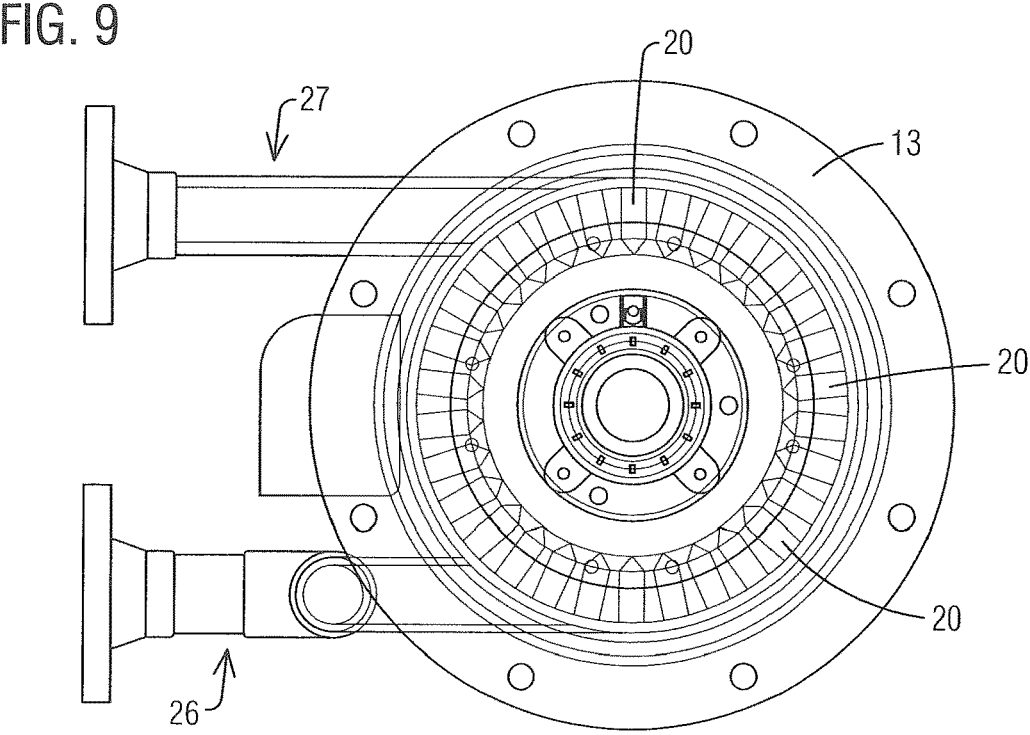
FIG. 9 is a right end transparency view of the controlled cavitation reactor shown in FIG. 1

FIG. 8 is a cross section through the central void 38 (FIG. 2) and through the outlet that communicates through the peripheral wall of the housing within the central void zone 38. Here, fluid that has passed in spiral fashion through the cavitation zone 24 as shown at 46 exiting the cavitation zone and moving into the central void zone 38. The peripheral wall 16 of the housing continues to confine the moving fluid to its spiral path within the central void zone as indicated at 47. Eventually, the treated fluid moves in a tangential direction out of the central void zone 38 and flows directly into the outlet 27 as shown at 48. As with the entering fluid, the treated fluid moves out of the cavitation zone, into the central void zone, and out of the housing without making any drastic changes in direction. Therefore, damage caused by abrasion, particularly with abrasive fluids, is greatly reduced within the central void zone and at the exit port just as it is with the entering fluid. FIG. 9 is the same cross section as FIG. 8, but shown in transparency to show the cavitation bores 20 formed through the peripheral surface of the rotor lobe.

FIGS. 1 through 9 illustrate an embodiment of the present invention that may be referred to as a "split rotor" controlled cavitation reactor. Such a rotor may be formed as a single machined piece, or may be formed of two separate rotors separated by a spacer. FIGS. 10 through 16 show an alternate embodiment employing a rotor that is not split. Many of the principles of this embodiment are the same as those discussed above relative to the split rotor embodiment and so these principles will not be discussed in detail again here. The discussion below will focus on the differences between the split rotor embodiment described above and the unitary rotor of the present embodiment.

Figure 10:
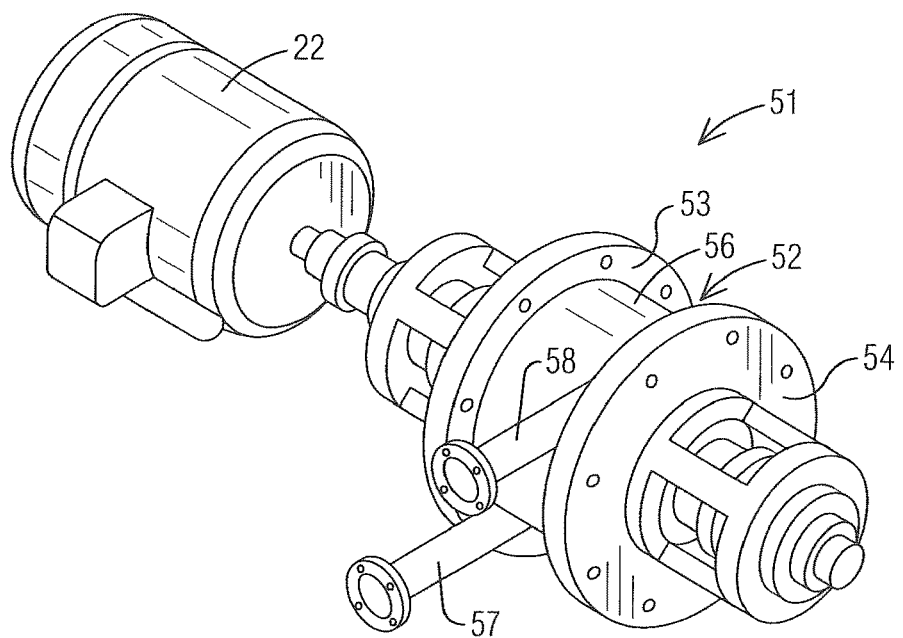
FIG. 10 is a perspective view of a controlled cavitation reactor that exemplifies principles of the present invention in a second preferred embodiment.
Figure 11:
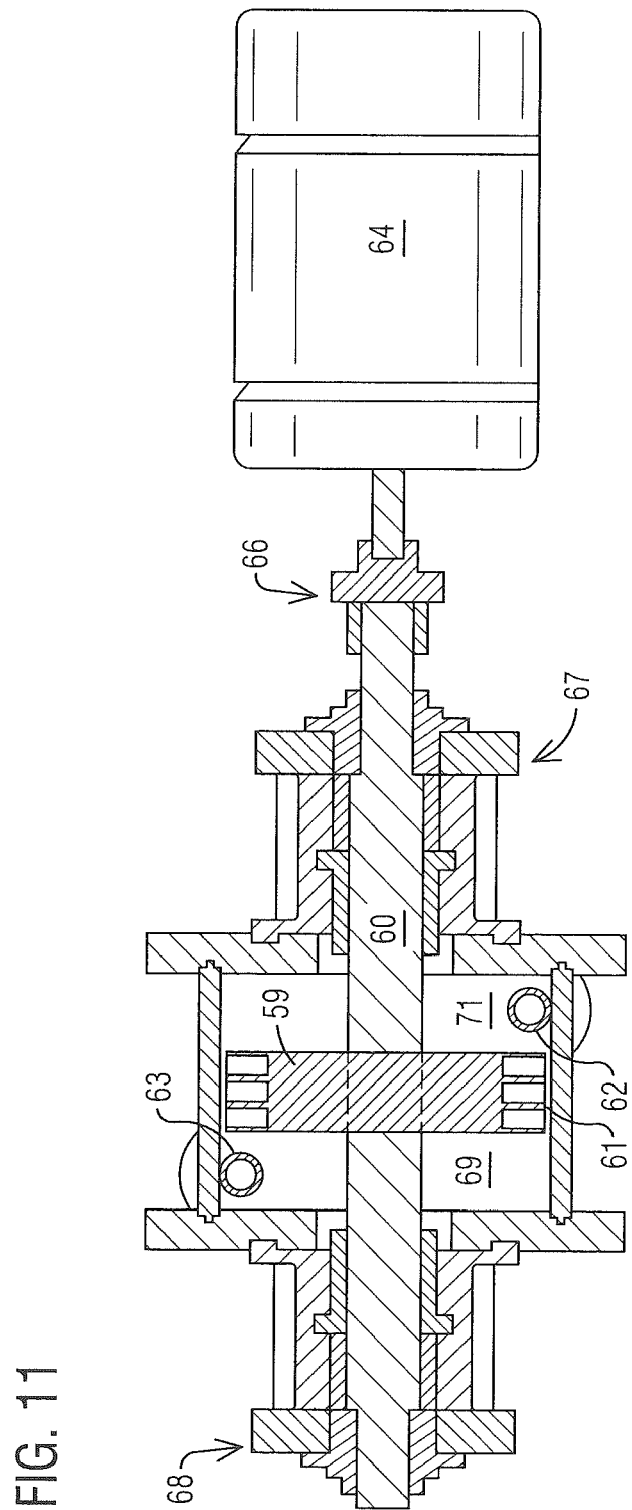
FIG. 11 is a rear cross sectional view of the controlled cavitation reactor shown in FIG. 10.

FIG. 10 shows a controlled cavitation reactor 51 having a housing 52 formed of a proximal endplate 53, a distal endplate 54, and a cylindrical peripheral wall 56. An inlet 57 communicates with the housing 52 on its lower side and an outlet 58 communicates with the housing on its upper side. Referring to FIG. 11, a unitary rotor 59 is mounted within the housing on a shaft 60 and the shaft 60 is rotatably journaled within a proximal bearing assembly 67 and a distal bearing assembly 68. The shaft 60 is coupled through coupler 66 to an electric motor 64, which, when activated, rotates the unitary rotor 59 within the housing in a counter-clockwise direction as viewed from the distal endplate 54 (FIG. 1). The inlet communicates with the housing through inlet port 62 and the outlet communicates with the housing through outlet port 63. As with the previous embodiment, the inlet and outlet ports are oriented to communicate tangentially with respect to the inner surface of the periphery wall 56 of the housing.

Figure 12:
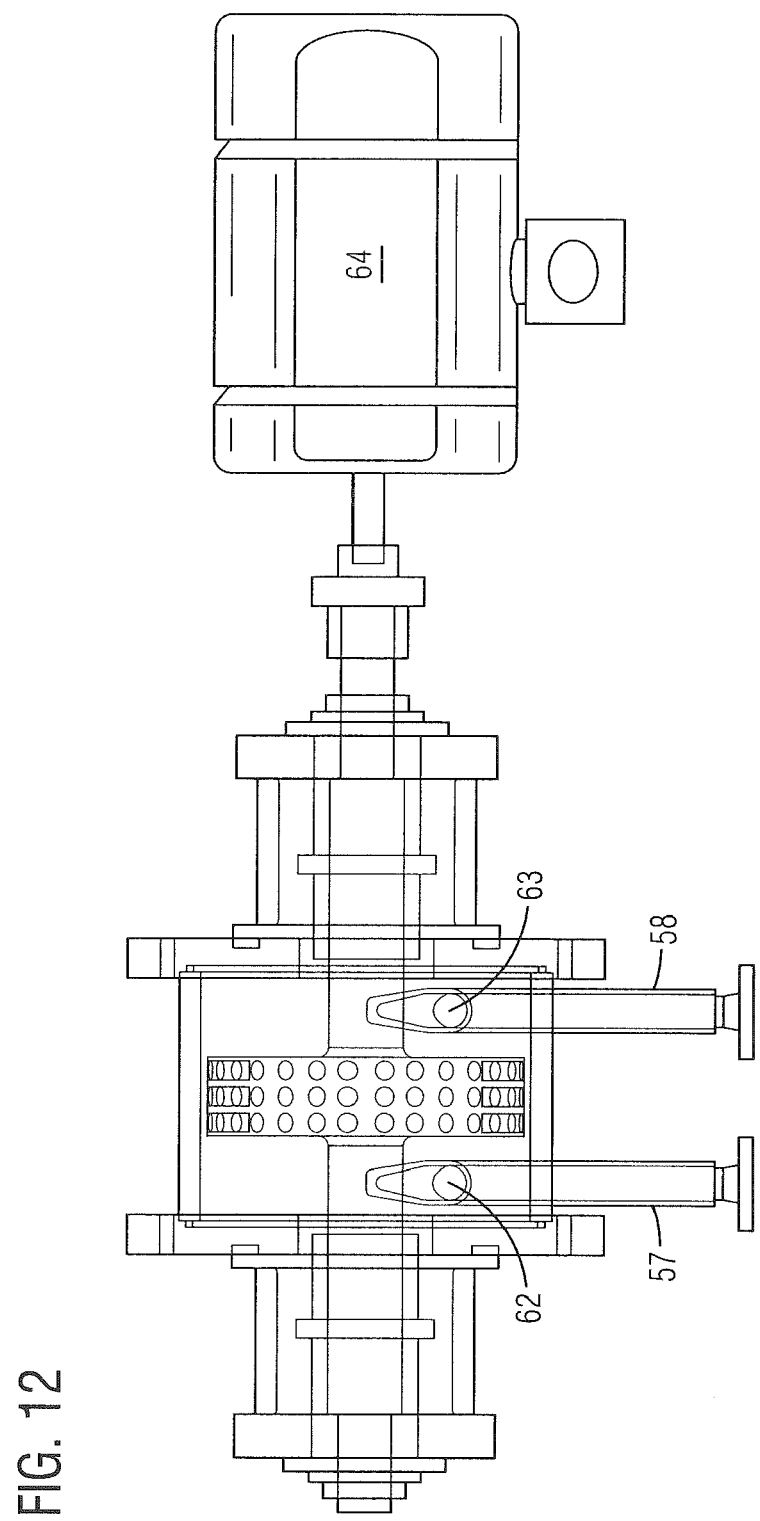
FIG. 12 is a top cross sectional view of the controlled cavitation reactor shown in FIG. 10
Figure 13:
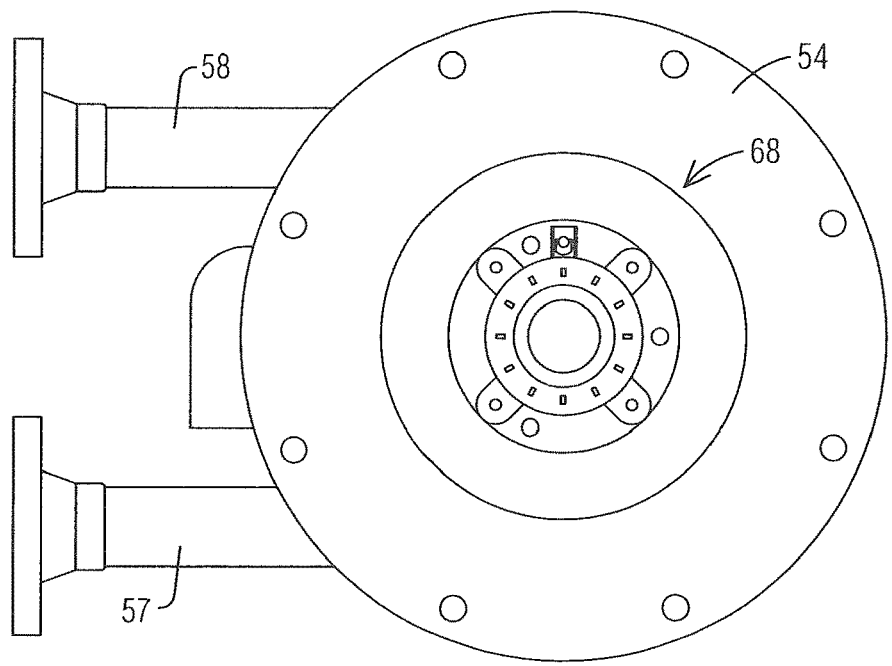
FIG. 13 is a right end view of the controlled cavitation reactor shown in FIG. 10.
Figure 14:
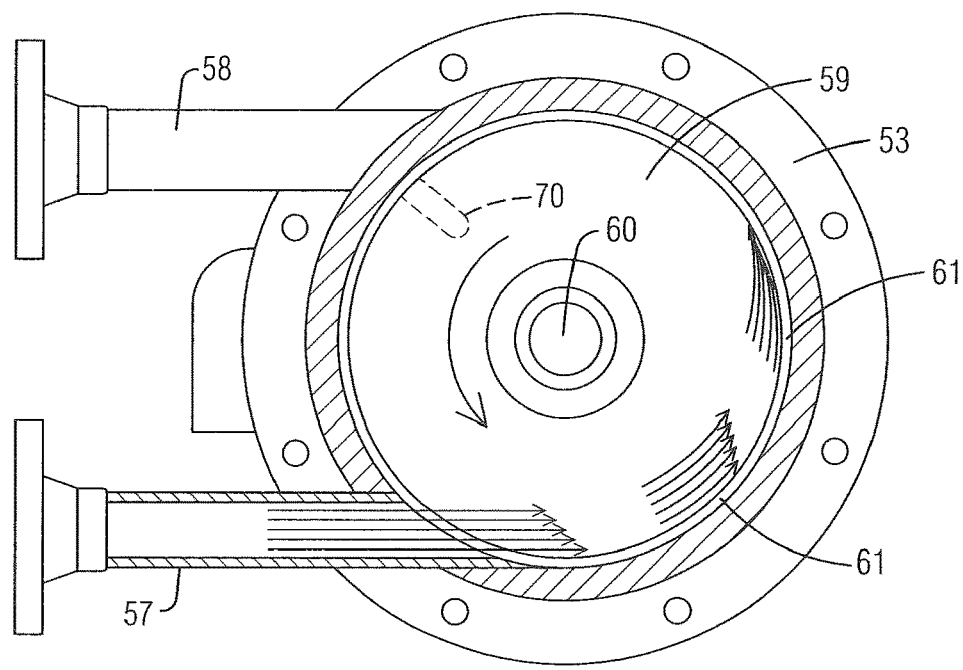
FIG. 14 is a radial cross sectional view of the controlled cavitation reactor shown in FIG. 10 taken along line 14-14 thereof.

FIG. 12 illustrates the controlled cavitation reactor of this embodiment from the top and in transparency. The shape of the inlet port 62 and the outlet port 63 are seen to be configured for tangential communication with the housing as described above. FIG. 13 is a view of the reactor as seen from the distal endplate 54 and shows the inlet 57, the outlet 58, and the distal bearing assembly 68. FIG. 14 is a partial cross sectional view taken through the peripheral wall of the housing and the inlet 57 at the location of the proximal void zone 71 (FIG. 11). The outline of the unitary rotor 59 is shown in this figure, but it will be understood that the rotor is actually located out of the plane of the page in the figure to show the cavitation zone 61.

In use, the unitary rotor 59 is rotated in the direction indicated by the arrow and fluid is pumped through the inlet 57 into the housing in a direction tangential to the inner surface of the peripheral wall. As in the previous embodiment, the fluid flow is directed into a circular or spiral configuration and eventually spirals into the cavitation zone 61 between the rotor and the peripheral housing. As the fluid spirals through the cavitation zone, it is subjected to high energy shock waves caused by cavitation events within the bores of the rotor.

Figure 15:
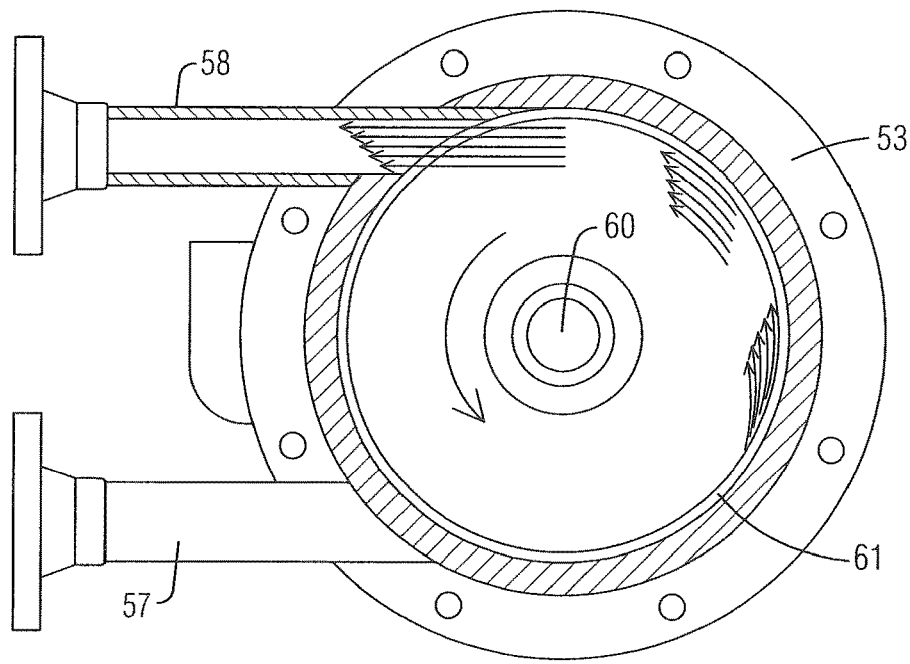
FIG. 15 is a radial cross sectional view of the controlled cavitation reactor shown in FIG. 10 taken along line 15-15 thereof.
Figure 16:
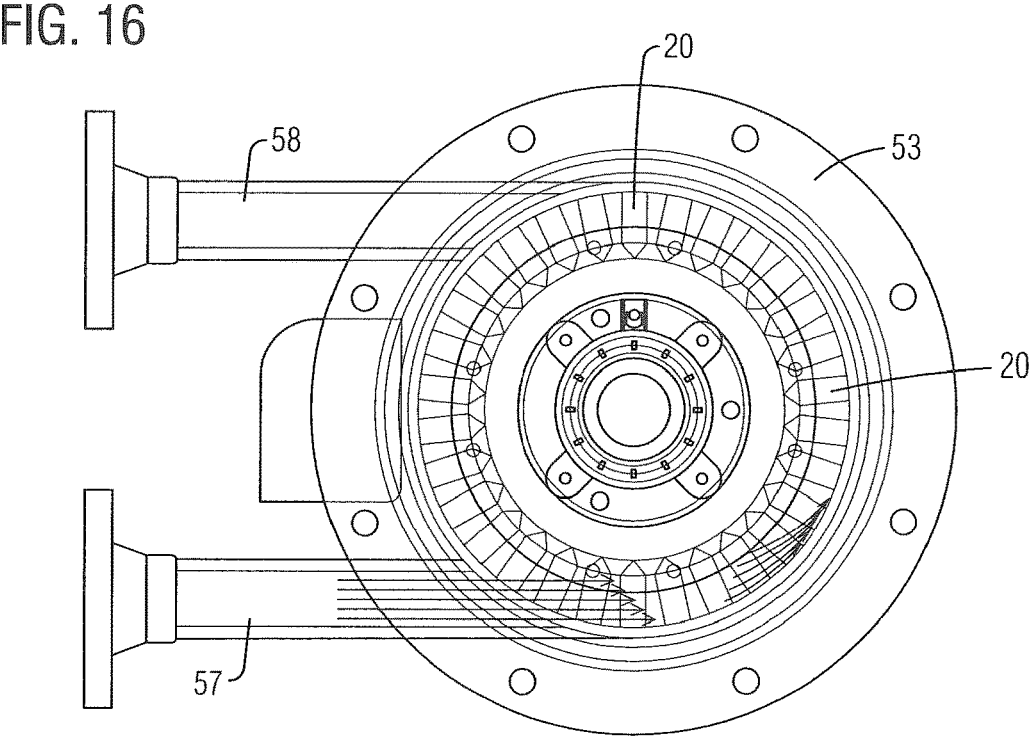
FIG. 16 is a right end transparency view of the controlled cavitation reactor shown in FIG. 10.

FIG. 15 is a cross sectional view taken through the distal void zone 69 of the housing and through the outlet 58. Fluid, still moving in a spiral fashion around the housing, is seen emerging from the cavitation zone 61 after having been treated to shockwaves therein. The spiraling treated fluid is directed around the inner surface of the peripheral wall of the housing until it moves into the outlet 58 and is extracted therethrough from the controlled cavitation reactor. As with the previous embodiment, the fluid has entered the reactor, moved through the cavitation zone for treatment, and exited the reactor without being subjected to severe changes in direction that can result in abrasion and damage to internal working components of the reactor. Thus, abrasive fluids are treated without significant erosion and damage as has been the case with prior art controlled cavitation reactors. FIG. 16 shows the cross section of FIG. 14 as a transparency so as to reveal a preferred arrangement of the cavitation bores formed through the peripheral surface of the unitary rotor of this embodiment.

Figure 17:
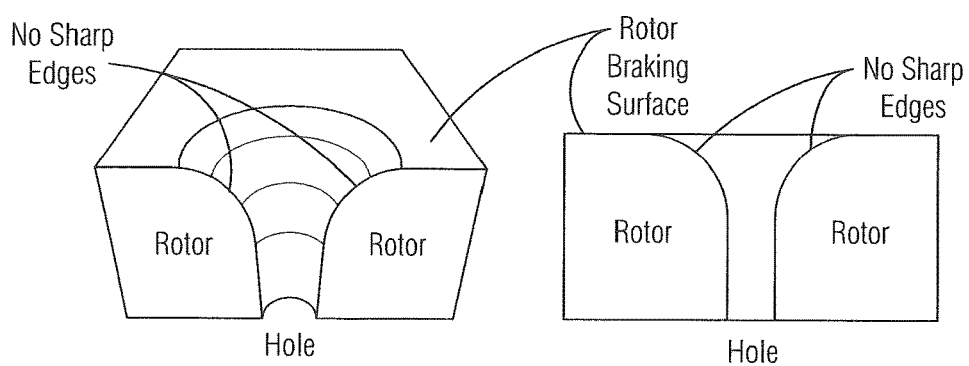
FIG. 17 shows a preferred configuration of the bores in the peripheral surface of the rotor to enhance the abrasion resistance of the reactor.

FIG. 17 illustrates a preferred embodiment of the bores formed in the peripheral surface of the rotor of the present invention. This figure shows only one bore for clarity, but it will be understood that the other bores of the rotor preferably are formed in the same way. As seen in FIG. 17, each bore has a fillet around its opening that forms a smooth transition from the peripheral surface of the rotor into the bore. As a result, there are no sharp edges that a fluid must transverse when entering the bores. It has been found that such a configuration reduces abrasion around the openings of the bores, a region that is subjected to extra high energy pressure waves because it is very close to the cavitation events taking place in the bores.

The invention has been described above in terms of exemplary embodiments considered by the inventor to represent the best modes of carrying out the invention. It will be appreciated by the skilled artisan, however, that a wide gamut of additions, deletions, and modifications, both subtle and gross, might well be made to the illustrative embodiments without departing from the spirit and scope of the invention, which is delineated only by the claims. For example, one of the example embodiments illustrates inlets within void zones to each side of a split rotor and an outlet in the void zone between the lobes of the split rotor. This arrangement could easily be switched so that the inlet was located in the void zone between the lobes of the split rotor and the outlets were located in the void zones on either side of the split rotor. In fact, in all embodiments described above, an inlet might just as well be an outlet and vice versa. As mentioned, the split rotor of the first embodiment can be machined from a single unitary piece of material or it can be formed by sandwiching a spacer or a disc of smaller diameter between two separate rotors. Both are considered within the scope of the invention.

What is claimed is:

1. Method of mixing materials comprising obtaining a controlled cavitation reactor having a cylindrical housing with a peripheral wall, a first cylindrical cavitation rotor mounted within the cylindrical housing with a first cavitation zone defined between a peripheral surface of the first cavitation rotor and an internal peripheral surface of the peripheral wall, a second cylindrical cavitation rotor mounted within the cylindrical housing with a second cavitation zone defined between a peripheral surface of the second cavitation rotor and the internal peripheral surface of the peripheral wall, the second cavitation rotor being axially aligned with the first cavitation rotor and spaced therefrom such that the first and second cavitation zones are separated by a no-cavitation zone, the first and second cavitation rotors having bores formed through their peripheral surfaces and the controlled cavitation reactor having no structures that protrude into the first and second cavitation zones, introducing materials to be mixed through the peripheral wall of the housing at a location between the first cavitation rotor and the second cavitation rotor and in the no-cavitation zone, allowing the introduced materials to pass through the first cavitation zone and the second cavitation zone, rotating the first and second cavitation rotors to create cavitation within the bores causing shock waves to propagate through the materials to be mixed within the first and second cavitation zones thereby mixing the materials, and withdrawing the materials so mixed from the housing after they have passed through the first and second cavitation zones.

2. Method of claim 1 wherein the materials include at least one fluid.

3. Method of claim 1 wherein the materials for mixing comprise oil field fluid materials.

4. Method of claim 3 wherein the oil field fluid is a drilling fluid.

5. Method of claim 1 wherein the materials to be mixed are introduced through the peripheral wall of the housing in a direction substantially tangent to the peripheral wall of the housing.

6. Method of claim 1 wherein the materials so mixed are withdrawn through the peripheral wall of the housing in a direction substantially tangent to the peripheral wall of the housing.

7. Method of claim 1 wherein the cavitation rotors are fixedly mounted on a rotatable shaft and wherein at least one disc having a diameter less than the diameters of the first and second cavitation rotors is also mounted on the shaft between the first and second cavitation rotors.

* * * * *